United States Patent
Kinoshita et al.

(10) Patent No.: US 10,730,520 B2
(45) Date of Patent: Aug. 4, 2020

(54) VEHICLE CONTROL APPARATUS

(71) Applicant: SUBARU CORPORATION, Tokyo (JP)

(72) Inventors: Takahiro Kinoshita, Tokyo (JP); Hirofumi Shimizu, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/407,755

(22) Filed: May 9, 2019

(65) Prior Publication Data

US 2020/0039518 A1    Feb. 6, 2020

(30) Foreign Application Priority Data

Aug. 1, 2018  (JP) ................. 2018-145247

(51) Int. Cl.
*B60W 10/02* (2006.01)
*B60W 30/18* (2012.01)
*B60W 10/06* (2006.01)

(52) U.S. Cl.
CPC .... *B60W 30/18136* (2013.01); *B60W 10/026* (2013.01); *B60W 10/06* (2013.01); *B60W 30/18127* (2013.01); *B60W 2510/0604* (2013.01); *B60W 2510/0638* (2013.01); *B60W 2510/30* (2013.01); *B60W 2520/10* (2013.01); *B60W 2710/024* (2013.01); *B60W 2710/025* (2013.01); *B60W 2710/0605* (2013.01); *B60W 2720/106* (2013.01)

(58) Field of Classification Search
None
See application file for complete search history.

(56) References Cited

U.S. PATENT DOCUMENTS

| 2004/0153235 | A1* | 8/2004 | Kataoka | B60K 6/485 701/112 |
| 2018/0050699 | A1* | 2/2018 | Gauthier | B60W 30/18009 |

FOREIGN PATENT DOCUMENTS

| JP | 2004-347004 A | 12/2004 |
| JP | 2005-075066 A | 3/2005 |
| JP | 2005-198413 A | 7/2005 |

* cited by examiner

*Primary Examiner* — Justin Holmes
(74) *Attorney, Agent, or Firm* — McDermott Will & Emery LLP

(57) ABSTRACT

A vehicle control apparatus includes an engine, a refrigerant compressor, a lock up clutch, a throttle valve, and first, second, and third deceleration controllers. The second deceleration controller controls the lock up clutch to a slip state and controls the throttle valve openwise on the condition that the refrigerant compressor is in the stopped state on decelerated travel of a vehicle in a second speed region in which a vehicle speed is lower than a first vehicle speed and higher than a second vehicle speed lower than the first vehicle speed. The second deceleration controller controls the lock up clutch to a disengaged state and controls the throttle valve closewise on the condition that the refrigerant compressor is in the operative state on the decelerated travel of the vehicle in the second speed region.

4 Claims, 12 Drawing Sheets

[DECELERATED TRAVEL CONTROL: WITH COMPRESSOR IN OPERATION]

VEHICLE CONTROL APPARATUS

CROSS-REFERENCE TO RELATED APPLICATIONS

This application claims priority from Japanese Patent Application No. 2018-145247 filed on Aug. 1, 2018, the entire contents of which are hereby incorporated by reference.

BACKGROUND

The technology relates to a vehicle control apparatus to be mounted on a vehicle. Vehicles such as automobiles control their engines to a fuel cut state on decelerated travel. In the fuel cut state, the engine stops fuel injection. For example, reference can be made to Japanese Unexamined Patent Application Publication (JP-A) Nos. 2004-347004, 2005-75066, and 2005-198413. During a fuel cut of the engine, an engine speed lowers to a predetermined lower limit speed, and thereupon, the fuel injection is restarted, rendering the engine idling.

SUMMARY

An aspect of the technology provides a vehicle control apparatus to be mounted on a vehicle. The vehicle control apparatus includes an engine, a refrigerant compressor, a lock up clutch, a throttle valve, a first deceleration controller, a second deceleration controller, and a third deceleration controller. The engine includes an intake system and is configured to be controlled from a fuel cut state to a fuel injection state on the condition that an engine speed lowers to a lower limit speed on decelerated travel of the vehicle. The refrigerant compressor is coupled to the engine and is configured to be controlled to an operative state and a stopped state. The lock up clutch is coupled to the engine and is configured to be controlled to an engaged state, a slip state, and a disengaged state. The throttle valve is provided in the intake system of the engine and is configured to be controlled openwise in which a throttle plate position of the throttle valve is greater than a reference throttle plate position and closewise in which the throttle plate position of the throttle valve is smaller than the reference throttle plate position. The first deceleration controller is configured to control the lock up clutch to the engaged state and control the throttle valve openwise on the decelerated travel of the vehicle in a first speed region in which a vehicle speed of the vehicle is higher than a first vehicle speed. The second deceleration controller is configured to control the lock up clutch to the slip state and control the throttle valve openwise on the condition that the refrigerant compressor is in the stopped state on the decelerated travel of the vehicle in a second speed region in which the vehicle speed is lower than the first vehicle speed and higher than a second vehicle speed lower than the first vehicle speed. The second deceleration controller is configured to control the lock up clutch to the disengaged state and control the throttle valve closewise on the condition that the refrigerant compressor is in the operative state on the decelerated travel of the vehicle in the second speed region. The third deceleration controller is configured to control the lock up clutch to the disengaged state and control the throttle valve closewise on the decelerated travel of the vehicle in a third speed region in which the vehicle speed is lower than the second vehicle speed.

An aspect of the technology provides a vehicle control apparatus to be mounted on a vehicle. The vehicle control apparatus includes an engine, a refrigerant compressor, a lock up clutch, a throttle valve, and circuitry. The engine includes an intake system and is configured to be controlled from a fuel cut state to a fuel injection state on the condition that an engine speed lowers to a lower limit speed on decelerated travel of the vehicle. The refrigerant compressor is coupled to the engine and is configured to be controlled to an operative state and a stopped state. The lock up clutch is coupled to the engine and is configured to be controlled to an engaged state, a slip state, and a disengaged state. The throttle valve is provided in the intake system of the engine and is configured to be controlled openwise in which a throttle plate position of the throttle valve is greater than a reference throttle plate position and closewise in which the throttle plate position of the throttle valve is smaller than the reference throttle plate position. The circuitry is configured to control the lock up clutch to the engaged state and control the throttle valve openwise on the decelerated travel of the vehicle in a first speed region in which a vehicle speed of the vehicle is higher than a first vehicle speed. The circuitry is configured to control the lock up clutch to the slip state and control the throttle valve openwise on the condition that the refrigerant compressor is in the stopped state on the decelerated travel of the vehicle in a second speed region in which the vehicle speed is lower than the first vehicle speed and higher than a second vehicle speed lower than the first vehicle speed. The circuitry is configured to control the lock up clutch to the disengaged state and control the throttle valve closewise on the condition that the refrigerant compressor is in the operative state on the decelerated travel of the vehicle in the second speed region. The circuitry is configured to control the lock up clutch to the disengaged state and control the throttle valve closewise on the decelerated travel of the vehicle in a third speed region in which the vehicle speed is lower than the second vehicle speed.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Figure 1:
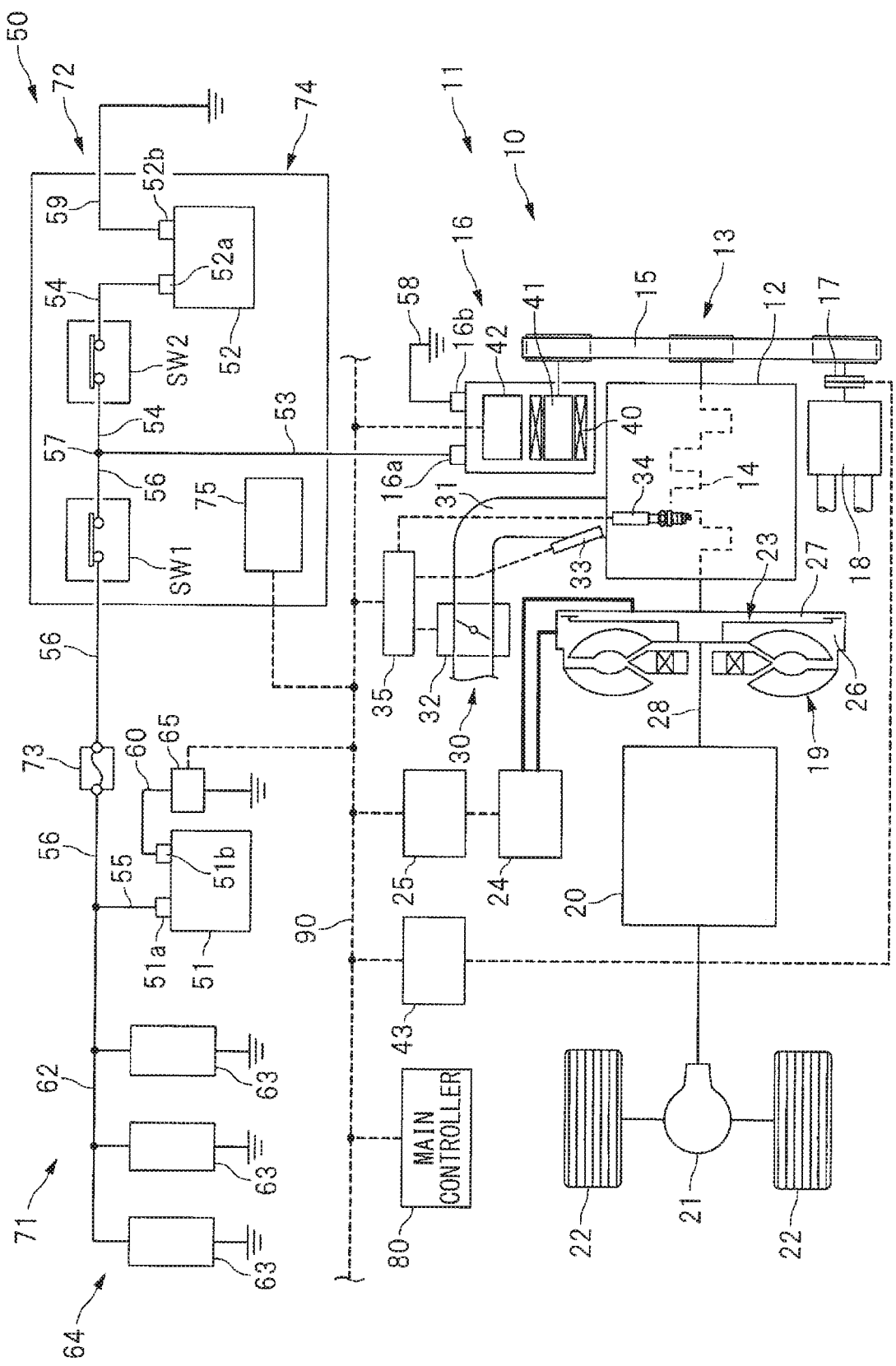
FIG. 1 is a schematic diagram of a configuration example of a vehicle on which a vehicle control apparatus according to one embodiment of the technology is mounted.

In the following, some preferred but non-limiting embodiments of the technology are described in detail with reference to the accompanying drawings. Note that sizes, materials, specific values, and any other factors illustrated in respective embodiments are illustrative for easier understanding of the technology, and are not intended to limit the scope of the technology unless otherwise specifically stated. Further, elements in the following example embodiments which are not recited in a most-generic independent claim of the technology are optional and may be provided on an as-needed basis. Throughout the present specification and the drawings, elements having substantially the same function and configuration are denoted with the same reference numerals to avoid any redundant description. Further, elements that are not directly related to the technology are unillustrated in the drawings. The drawings are schematic and are not intended to be drawn to scale.

What is important on decelerated travel is to continue a fuel cut as long as possible, from viewpoint of reduction in an amount of fuel consumption of an engine. A possible measure to be taken on the decelerated travel may be to lower an engine speed slowly by engaging a lock up clutch while opening a throttle valve to reduce a pumping loss. Moreover, opening the throttle valve on the decelerated travel causes an increase in an amount of intake air of the engine. This renders it desirable to reduce the amount of the intake air before a restart of fuel injection.

Meanwhile, a compressor of an air conditioner is coupled to the engine. Depending on an operation state of the compressor, there arises possibility of a rapid increase in an engine load, resulting in a rapid decrease in the engine speed. In other words, depending on the operation state of the compressor, there is possibility of the restart of the fuel injection before the reduction in the amount of the intake air, resulting in an excessive output of engine torque. Such an excessive output of the engine torque at the restart of the fuel injection may constitute a possible cause of reduction in a vehicle deceleration rate, which may give a sense of incongruity to an occupant. What is desired is, therefore, to control the engine appropriately in preparation for the restart of the fuel injection.

It is desirable to provide a vehicle control apparatus that makes it possible to control an engine appropriately in preparation for a restart of fuel injection.

[Vehicle Configuration]

FIG. 1 schematically illustrates a configuration example of a vehicle 11 on which a vehicle control apparatus 10 according to one embodiment of the technology is mounted. Referring to FIG. 1, on the vehicle 11, a power unit 13 may be mounted. The power unit 13 may include an engine 12 that serves as a power source. The engine 12 may include a crank shaft 14 to which a starter generator 16 may be coupled through a belt mechanism 15. Moreover, a compressor 18 of an air conditioner is coupled to the crank shaft 14 of the engine 12 through the belt mechanism 15 and an air conditioner clutch 17. Furthermore, a transmission mechanism 20 may be coupled to the engine 12 through a torque converter 19. One or more wheels 22 may be coupled to the transmission mechanism 20 through, for example but not limited to, a differential mechanism 21.

In one embodiment of the technology, the starter generator 16 may serve as a "motor generator". In one embodiment of the technology, the compressor 18 may serve as a "refrigerant compressor".

The torque converter 19 coupled to the crank shaft 14 of the engine 12 may include a lock up clutch 23. In other words, the lock up clutch 23 is coupled to the engine 12. In order to control the lock up clutch 23, a valve unit 24 may be coupled to the torque converter 19, and a transmission controller 25 may be coupled to the valve unit 24. The valve unit 24 may include, for example but not limited to, a solenoid valve and an oil path. The transmission controller 25 may include, for example but not limited to, a microcomputer. Allowing the transmission controller 25 to control the valve unit 24 makes it possible to control oil pressure of an application chamber 26 and a release chamber 27, and to control the lock up clutch 23 to an engaged state, a slip state, and a disengaged state.

Controlling the lock up clutch 23 to the engaged state and the slip state causes the crank shaft 14 and a turbine shaft 28 to be coupled to each other through the lock up clutch 23. Controlling the lock up clutch 23 to the engaged state makes it possible to allow rotation speeds of the crank shaft 14 and the turbine shaft 28 to coincide with each other. Controlling the lock up clutch 23 to the slip state makes it possible to allow the rotation speeds of the crank shaft 14 and the turbine shaft 28 to deviate from each other. Controlling the lock up clutch 23 to the disengaged state causes the crank shaft 14 and the turbine shaft 28 to be coupled to each other through the torque converter 19.

The engine 12 includes an intake system 30. The intake system 30 may include an intake manifold 31. The intake manifold 31 may include a throttle valve 32 that adjusts an amount of intake air. Opening the throttle valve 32 to increase area of a flow path makes it possible to increase the amount of the intake air of the engine 12. Closing the throttle valve 32 to reduce the area of the flow path makes it possible to reduce the amount of the intake air of the engine 12. The engine 12 may further include an injector 33 that injects fuel into an intake port and a cylinder. Fuel injection from the injector 33 causes the engine 12 to be controlled to a fuel injection state. Stopping the fuel injection from the injector 33 causes the engine 12 to be controlled to a fuel cut state. The engine 12 may further include an ignition device 34. The ignition device 34 may include an igniter and an ignition coil. Allowing the ignition device 34 to control ignition timing makes it possible to control, for example but not limited to, engine torque. It is to be noted that an engine controller 35 may be coupled to the throttle valve 32, the injector 33, and the ignition device 34. The engine controller 35 may include, for example but not limited to, a microcomputer.

The starter generator 16 coupled to the engine 12 may be a so-called integrated starter generator (ISG) that serves as a generator and an electric motor. Not only may the starter generator 16 serve as the generator driven by the crank shaft 14, the starter generator 16 may also serve as the electric motor that causes rotation of the crank shaft 14. For example, the starter generator 16 may be controlled to a powering state, in a case of a restart of the engine 12 in an idling stop control, or in a case of assist driving of the engine 12 at the time of, for example, a start and acceleration. In this way, the starter generator 16 may serve as the electric motor. The starter generator 16 may include a stator 40 and a rotor 41. The stator 40 may include a stator coil. The rotor 41 may include a field coil. The starter generator 16 may further include an ISG controller 42, in order to control energized states of the stator coil and the field coil. The ISG controller 42 may include an inverter, a regulator, and a microcomputer, without limitation. Allowing the ISG controller 42 to control the energized states of the field coil and the stator coil makes it possible to control, for example but not limited to, a power generation voltage, power generation torque, and powering torque of the starter generator 16.

The compressor 18 coupled to the engine 12 may serve as a refrigerant compressor that constitutes a refrigeration cycle of the air conditioner. An undepicted refrigerant circulation circuit of the air conditioner may include not only the compressor 18 that compresses refrigerant, but also an undepicetd condenser that liquefies the refrigerant and an undepicted evaporator that vaporizes the refrigerant. Controlling the air conditioner clutch 17 between the engine 12 and the compressor 18 to an engaged state makes it possible to couple the engine 12 and the compressor 18 to each other, and to control the compressor 18 to an operative state. Controlling the air conditioner clutch 17 to a disengaged state makes it possible to isolate the engine 12 and the compressor 18 from each other, and to control the compressor 18 to a stopped state. Moreover, in order to control the air conditioner clutch 17, an air conditioner controller 43 may be provided. The air conditioner controller 43 may include, for example but not limited to, a microcomputer. It is to be noted that the air conditioner clutch 17 may include, for example but not limited to, an electromagnetic clutch.

[Power Circuit]

Figure 2:
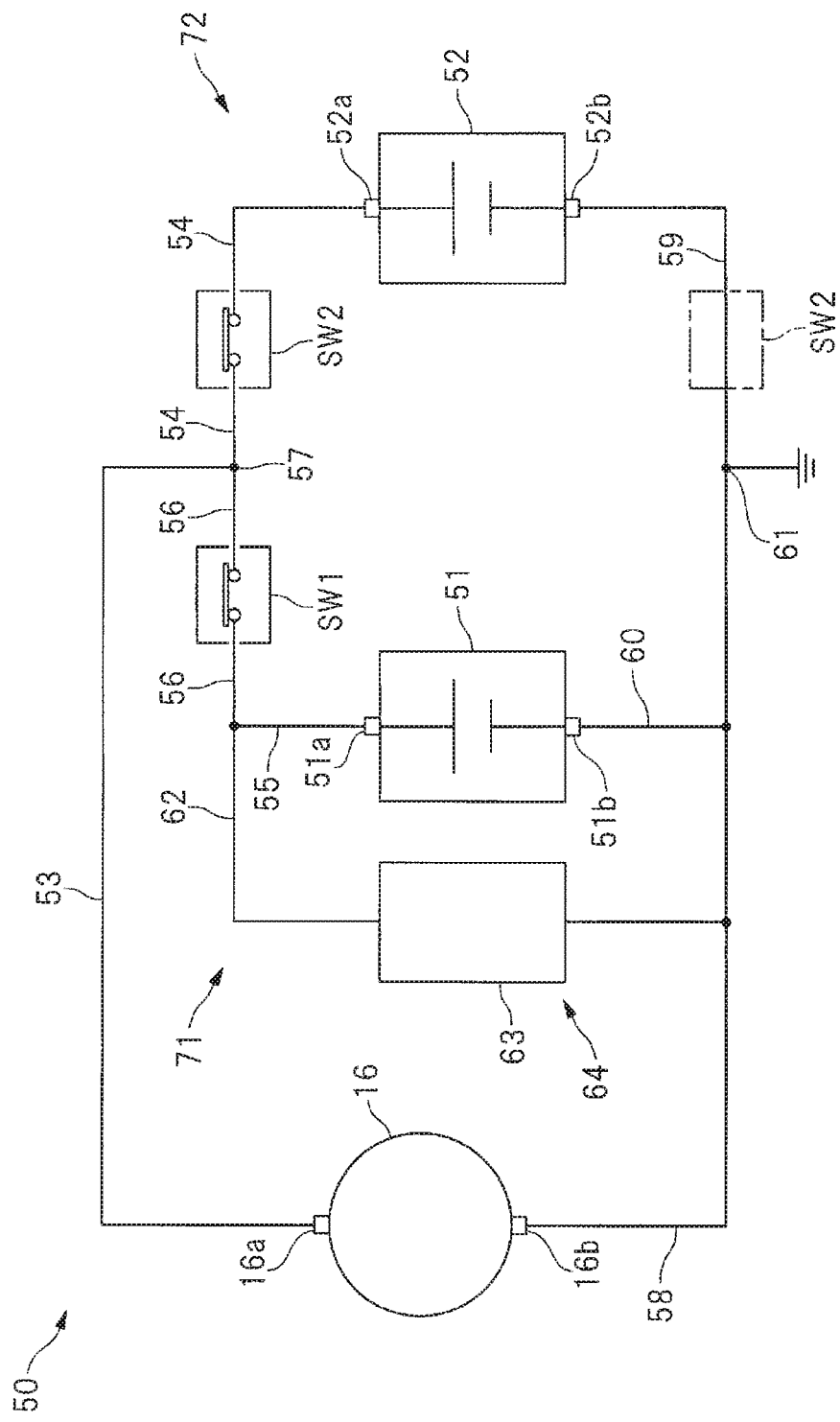
FIG. 2 is a circuit diagram of a simplified example of a power circuit.

The vehicle 11 may include a power circuit 50, description of which is given below. FIG. 2 is a circuit diagram of a simplified example of the power circuit 50. Referring to FIG. 2, the power circuit 50 may include a lead battery 51 and a lithium ion battery 52. The lead battery 51 may be electrically coupled to the starter generator 16. The lithium ion battery 52 may be electrically coupled, in parallel with the lead battery 51, to the starter generator 16. It is to be noted that a terminal voltage of the lithium ion battery 52 may be higher in design than a terminal voltage of the lead battery 51, in order to positively cause discharge of the lithium ion battery 52. Moreover, internal resistance of the lithium ion battery 52 may be smaller in design than internal resistance of the lead battery 51, in order to positively cause charge and the discharge of the lithium ion battery 52.

A positive electrode line 53 may be coupled to a positive electrode terminal 16a of the starter generator 16. A positive electrode line 54 may be coupled to a positive electrode terminal 52a of the lithium ion battery 52. A positive electrode line 56 may be coupled to a positive electrode terminal 51a of the lead battery 51 through a positive electrode line 55. The positive electrode lines 53, 54, and 56 may be coupled to one another through a connection point 57. Moreover, a negative electrode line 58 may be coupled to a negative electrode terminal 16b of the starter generator 16. A negative electrode line 59 may be coupled to a negative electrode terminal 52b of the lithium ion battery 52. A negative electrode line 60 may be coupled to a negative electrode terminal 51b of the lead battery 51. The negative electrode lines 58, 59, and 60 may be coupled to one another through a reference potential point 61.

As illustrated in FIG. 1, to the positive electrode line 55 of the lead battery 51, coupled may be a positive electrode line 62. To the positive electrode line 62, coupled may be a group of electric devices 64. The group of the electric devices 64 may include electric devices 63 such as various actuators and various controllers. Furthermore, a battery sensor 65 may be provided on the negative electrode line 60 of the lead battery 51. The battery sensor 65 may have a function of detecting a charge state and a discharge state of the lead battery 51. Non-limiting examples of the charge state and the discharge state of the lead battery 51 may include a charge current, a discharge current, the terminal voltage, and a state of charge SOC of the lead battery 51. It is to be noted that the state of charge SOC refers to a ratio of an amount of charged power to a designed capacity of a battery. In other words, the state of charge SOC means a ratio of an amount of remaining electrical energy to a full charge capacity of a battery.

The power circuit 50 may include a first power supply system 71 and a second power supply system 72. The first power supply system 71 may include, for example but not limited to, the lead battery 51 and the electric devices 63. The second power supply system 72 may include, for example but not limited to, the lithium ion battery 52 and the starter generator 16. The lead battery 51 and the lithium ion battery 52 may be coupled in parallel to each other through the positive electrode line 56 provided between the first power supply system 71 and the second power supply system 72. On the positive electrode line 56, provided may be an electric power fuse 73 and a switch SW1. The electric power fuse 73 may be melt down by an excessive current. The switch SW1 may be controlled to an ON state and an OFF state. On the positive electrode line 54 of the lithium ion battery 52, provided may be a switch SW2. The switch SW2 may be controlled to an ON state and an OFF state.

Controlling the switch SW1 to the ON state makes it possible to couple the first power supply system 71 and the second power supply system 72 to each other. Controlling the switch SW1 to the OFF state makes it possible to isolate the first power supply system 71 and the second power supply system 72 from each other. Controlling the switch SW2 to the ON state makes it possible to couple the starter generator 16 and the lithium ion battery 52 to each other. Controlling the switch SW2 to the OFF state makes it possible to isolate the starter generator 16 and the lithium ion battery 52 from each other.

The switches SW1 and SW2 may each be a switch constituted by a semiconductor element such as a metal oxide semiconductor field effect transistor (MOSFET), or alternatively the switches SW1 and SW2 may each be a switch that causes a contact to mechanically open or close with the use of, for example but not limited to, electromagnetic force. The ON state of the switches SW1 and SW2 refers to an energized state that forms electrical coupling, or a conductive state. The OFF state of the switches SW1 and SW2 refers to a non-energized state that forms electrical isolation, or a cutoff state. It is to be noted that the switches SW1 and SW2 may be also referred to as, for example, a relay or a contactor.

As illustrated in FIG. 1, the power circuit 50 may include a battery module 74. The battery module 74 may include not only the lithium ion battery 52 but also the switches SW1 and SW2. The battery module 74 may further include a battery controller 75. The battery controller 75 may include, for example but not limited to, a microcomputer and various sensors. The battery controller 75 may have a function of monitoring, for example but not limited to, a state of charge SOC, a charge current, a discharge current, the terminal voltage, a cell temperature, and the internal resistance of the lithium ion battery 52. The battery controller 75 may also have a function of controlling the switches SW1 and SW2.

[Control System]

Figure 3:
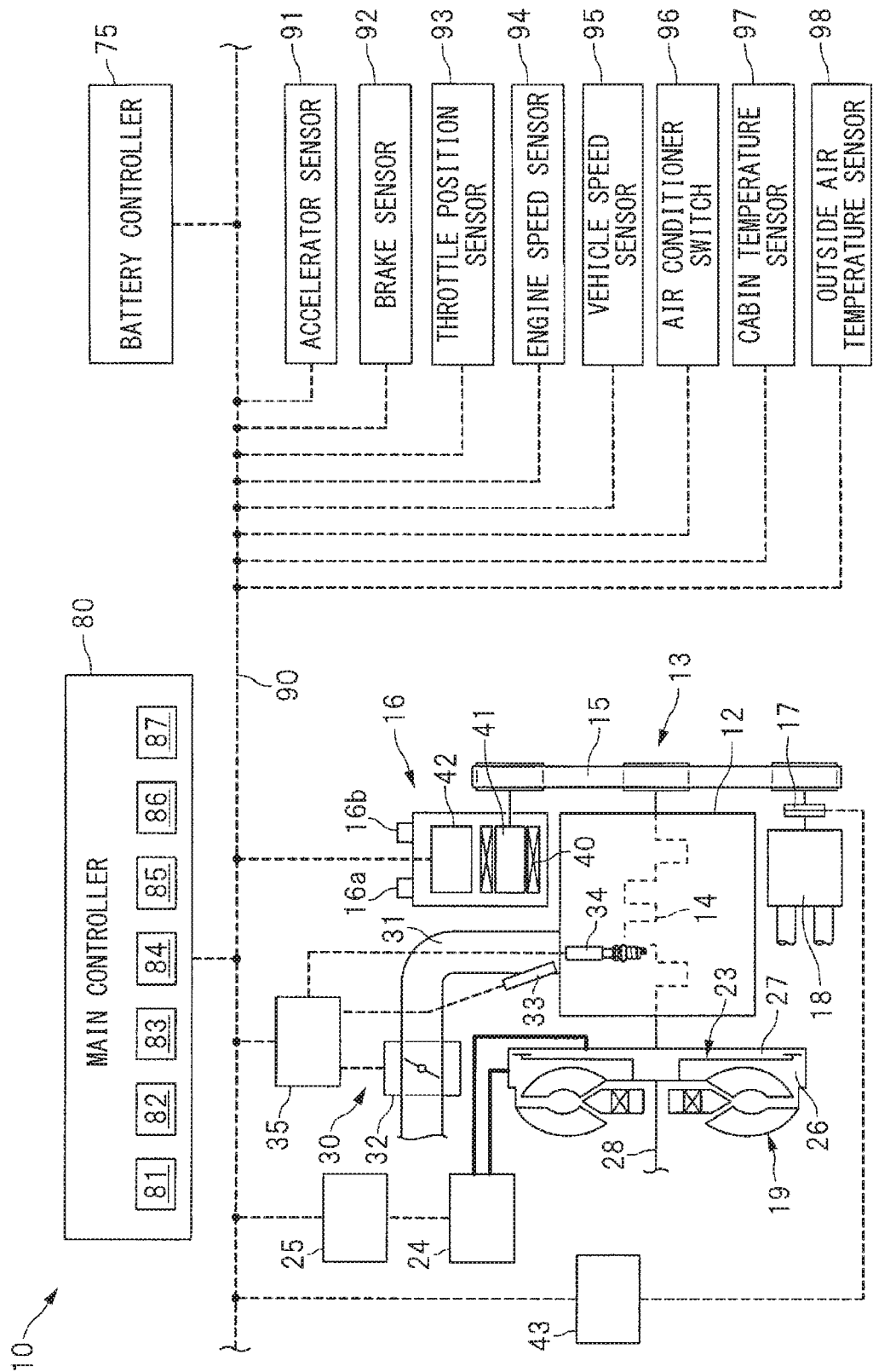
FIG. 3 is a schematic diagram of an example of a control system of the vehicle control apparatus.

FIG. 3 schematically illustrates an example of a control system of the vehicle control apparatus 10. As illustrated in FIGS. 1 and 3, the vehicle control apparatus 10 may include a main controller 80. The main controller 80 is provided for a cooperative control of, for example but not limited to, the engine 12, the lock up clutch 23, the starter generator 16, and the power circuit 50. The main controller 80 may include, for example but not limited to, a microcomputer. The main controller 80 may include, for example but not limited to, a fuel control unit 81, an ignition control unit 82, a throttle valve control unit 83, a lock up clutch control unit 84, and an ISG control unit 85. The fuel control unit 81 may control the injector 33. The ignition control unit 82 may control the ignition device 34. The throttle valve control unit 83 may control the throttle valve 32. The lock up clutch control unit 84 may control the lock up clutch 23. The ISG control unit 85 may control the starter generator 16. The main controller 80 may further include, for example but not limited to, a compressor control unit 86 and a switch control unit 87. The compressor control unit 86 may control the compressor 18. The switch control unit 87 may control the switches SW1 and SW2.

In one embodiment of the technology, the ISG control unit 85 may serve as a "motor controller". In one embodiment of the technology, the throttle valve control unit 83 and the lock up clutch control unit 84 may serve as a "first deceleration controller", a "second deceleration controller", and a "third deceleration controller" that control the throttle valve 32 and the lock up clutch 23 in a decelerated travel control described later.

The main controller 80, the transmission controller 25, the engine controller 35, the ISG controller 42, the air conditioner controller 43, and the battery controller 75 may be communicatively coupled to one another through an on-vehicle network 90 such as a controller area network (CAN) and a local interconnect network (LIN). On the basis of information from the controllers and the sensors, the main controller 80 may control the engine 12, the lock up clutch 23, the starter generator 16, and the power circuit 50, without limitation. It is to be noted that the main controller 80 may control the throttle valve 32, the injector 33, and the ignition device 34 through the engine controller 35. The main controller 80 may control the starter generator 16 through the ISG controller 42. The main controller 80 may control the lock up clutch 23 through the transmission controller 25. Furthermore, the main controller 80 may control the compressor 18 through the air conditioner controller 43. The main controller 80 may control the switches SW1 and SW2 through the battery controller 75.

As illustrated in FIG. 3, the sensors may be coupled to the main controller 80. Non-limiting examples of the sensors may include an accelerator sensor 91, a brake sensor 92, a throttle position sensor 93, an engine speed sensor 94, and a vehicle speed sensor 95. The accelerator sensor 91 may detect an amount of operation of an accelerator pedal. The brake sensor 92 may detect an amount of operation of a brake pedal. The throttle position sensor 93 may detect a throttle plate position of the throttle valve 32. The engine speed sensor 94 may detect an engine speed, i.e., a rotation speed of the engine 12. The vehicle speed sensor 95 may detect a vehicle speed, i.e., a travel speed of the vehicle 11. Other non-limiting examples of the sensors to be coupled to the main controller 80 may include an air conditioner switch 96, a cabin temperature sensor 97, and an outside air temperature sensor 98. The air conditioner switch 96 may be operated at the time of, for example but not limited to, a start up of the air conditioner. The cabin temperature sensor 97 may detect a temperature inside a cabin. The outside air temperature sensor 98 may detect a temperature of outside air.

[Power Generation Control of Starter Generator]

Description is given next of a power generation control of the starter generator 16. The power generation control may be made by the main controller 80. The ISG control unit 85 of the main controller 80 may supply a control signal to the ISG controller 42, to control the starter generator 16 to a power generation state or the powering state. The power generation state of the starter generator 16 may include a combustion power generation state and a regenerative power generation state described later. For example, in a case where the state of charge SOC of the lithium ion battery 52 lowers, the ISG control unit 85 may raise the power generation voltage of the starter generator 16 to control the starter generator 16 to the combustion power generation state. In a case where the state of charge SOC of the lithium ion battery 52 increases, the ISG control unit 85 may lower the power generation voltage of the starter generator 16, to control the starter generator 16 to a power generation suspended state.

Figure 4:
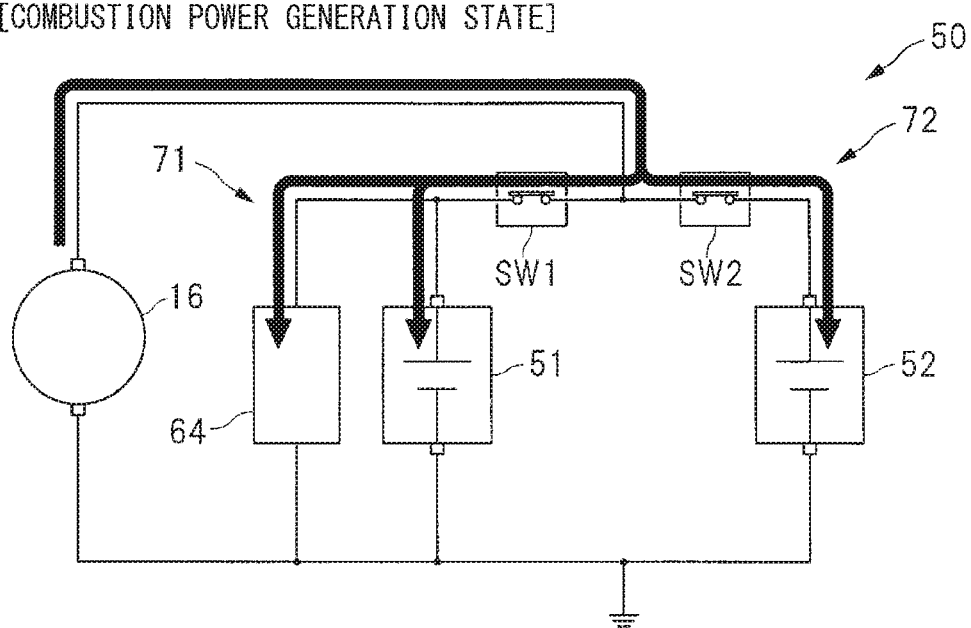
FIG. 4 is a diagram of an example of a situation as to how currents are supplied, with a starter generator controlled to a combustion power generation state.

FIG. 4 illustrates an example of a situation as to how currents are supplied, with the starter generator 16 controlled to the combustion power generation state. It is to be noted that the combustion power generation state of the starter generator 16 means allowing, by engine power, the starter generator 16 to generate power, i.e., causing fuel combustion inside the engine 12 to allow the starter generator 16 to generate power. In one specific but non-limiting example, in a case where the state of charge SOC of the lithium ion battery 52 is lower than a predetermined lower limit, the starter generator 16 may be allowed, by the engine power, to generate power, in order to charge the lithium ion battery 52 and to increase the state of charge SOC. Thus, in controlling the starter generator 16 to the combustion power generation state, the power generation voltage of the starter generator 16 may be raised to a higher value than the terminal voltages of the lead battery 51 and the lithium ion battery 52. In this way, as denoted by black arrows in FIG. 4, currents may be supplied from the starter generator 16 to, for example but not limited to, the lithium ion battery 52, the group of the electric devices 64, and the lead battery 51, causing the lithium ion battery 52 and the lead battery 51 to be charged slowly.

Figure 5:
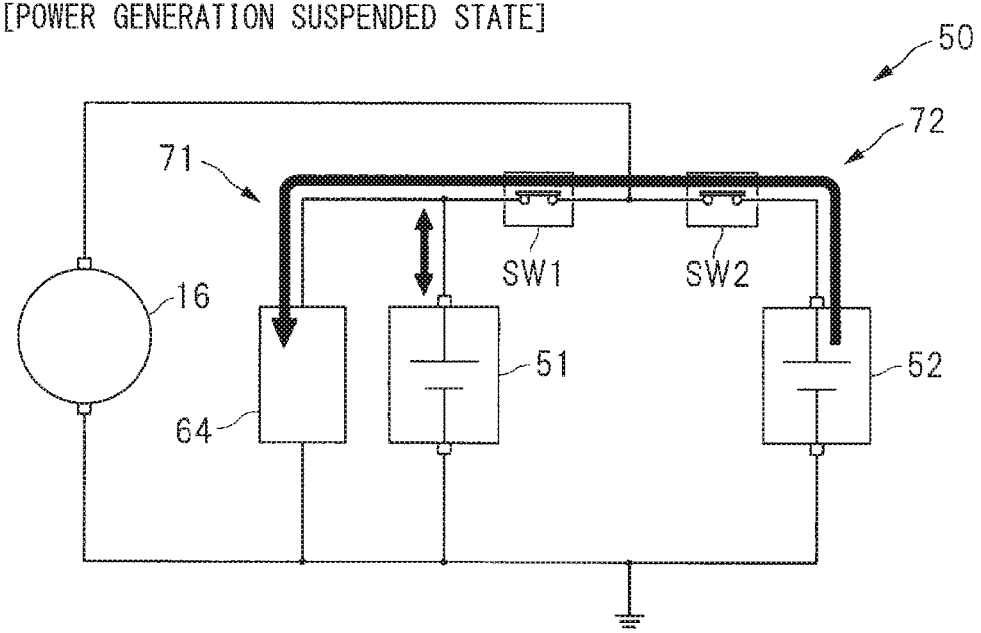
FIG. 5 is a diagram of an example of a situation as to how currents are supplied, with the starter generator controlled to a power generation suspended state.

FIG. 5 illustrates an example of a situation as to how currents are supplied, with the starter generator 16 controlled to the power generation suspended state. In one specific but non-limiting example, in a case where the state of charge SOC of the lithium ion battery 52 is higher than a predetermined upper limit, power generation of the starter generator 16 with the use of the engine power may be stopped, in order to positively cause the discharge of the lithium ion battery 52. Thus, in controlling the starter generator 16 to the power generation suspended state, the power generation voltage of the starter generator 16 may be lowered to a lower value than the terminal voltages of the lead battery 51 and the lithium ion battery 52. In this way, as denoted by black arrows in FIG. 5, a current may be supplied from the lithium ion battery 52 to the group of the electric devices 64. This makes it possible to stop the power generation of the starter generator 16, leading to reduction in an engine load. It is to be noted that it suffices for the power generation voltage of the starter generator 16 in the power generation suspended state to be a power generation voltage that causes the discharge of the lithium ion battery 52. For example, the power generation voltage of the starter generator 16 may be controlled to zero (0) V, or alternatively, the power generation voltage of the starter generator 16 may be controlled to a higher value than zero (0) V.

As mentioned above, the ISG control unit 85 of the main controller 80 may control the starter generator 16 to the combustion power generation state or the power generation suspended state on the basis of the state of charge SOC. Meanwhile, during vehicle deceleration, it is desirable to recover much kinetic energy to enhance fuel consumption performance. Therefore, during the vehicle deceleration, the power generation voltage of the starter generator 16 may be raised, to control the starter generator 16 to the regenerative power generation state. This makes it possible to increase power-generated electric power of the starter generator 16, and to positively convert the kinetic energy to electric energy and to recover the electric energy, leading to higher energy efficiency of the vehicle 11 and the enhancement in the fuel consumption performance. A determination as to whether or not to execute such regenerative power generation may be made on the basis of, for example but not limited to, operation states of the accelerator pedal and the brake pedal. For example, on the decelerated travel with a release of stepping down of the accelerator pedal, or on the decelerated travel with stepping down of the brake pedal, the starter generator 16 may be controlled to the regenerative power generation state.

Figure 6:
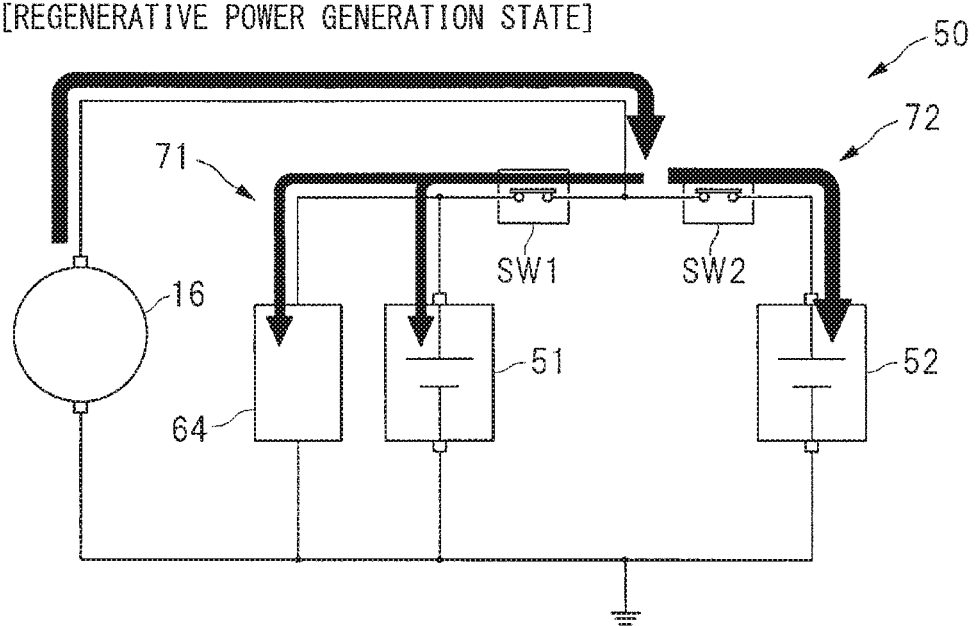
FIG. 6 is a diagram of an example of a situation as to how currents are supplied, with the starter generator controlled to a regenerative power generation state.

FIG. 6 illustrates an example of a situation as to how currents are supplied, with the starter generator 16 controlled to the regenerative power generation state. In controlling the starter generator 16 to the regenerative power generation state, the power generation voltage of the starter generator 16 may be raised to an even higher value than that in the combustion power generation state as mentioned above. This causes large current supply from the starter generator 16 to the lithium ion battery 52 and the lead battery 51, as denoted by black arrows in FIG. 6, resulting in rapid charge of the lithium ion battery 52 and the lead battery 51. Moreover, because the internal resistance of the lithium ion battery 52 is smaller than the internal resistance of the lead battery 51, most of the power-generated current is supplied to the lithium ion battery 52.

It is to be noted that as illustrated in FIGS. 4 to 6, in controlling the starter generator 16 to the combustion power generation state, the regenerative power generation state, and the power generation suspended state, the switches SW1 and SW2 may be kept in the ON state. In other words, in the power circuit 50 illustrated in the figures, it is possible to control the charge and the discharge of the lithium ion battery 52 solely by controlling the power generation voltage of the starter generator 16 without making a switching control of the switches SW1 and SW2. Hence, it is possible to easily control the charge and the discharge of the lithium ion battery 52, and to enhance durability of the switches SW1 and SW2.

[Powering Control of Starter Generator]

Figure 7:
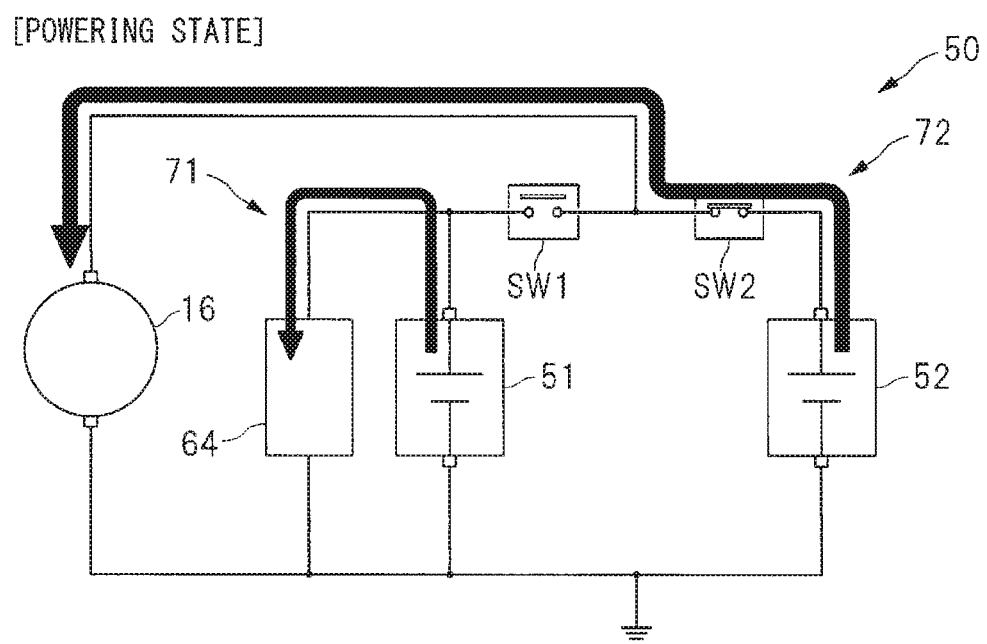
FIG. 7 is a diagram of an example of a situation as to how currents are supplied, with the starter generator controlled to a powering state.

Described next is a powering control of the starter generator 16. The ISG control unit 85 of the main controller 80 may control the starter generator 16 to the powering state, in the case of, for example, the restart of the engine 12 in the idling stop control. FIG. 7 illustrates an example of a situation as to how currents are supplied, with the starter generator 16 controlled to the powering state. Referring to FIG. 7, in controlling the starter generator 16 to the powering state at the restart of the engine 12 in the idling stop control, the switch SW1 may be switched from the ON state to the OFF state. This makes it possible to prevent an instantaneous voltage drop with respect to the group of the electric devices 64, even in a case with large current supply from the lithium ion battery 52 to the starter generator 16. Hence, it is possible to allow, for example, the group of the electric devices 64 to function normally.

It is to be noted that in the example illustrated in FIG. 7, the switch SW1 is switched to the OFF state, in controlling the starter generator 16 to the powering state. However, this is non-limiting. The starter generator 16 may be controlled to the powering state, with the switch SW1 kept in the ON state. For example, in a motor assistance control that includes providing assistance with the engine 12 at the time of the start or the acceleration, power consumption of the starter generator 16 is smaller than power consumption at the restart of the engine 12 as mentioned above. Accordingly, the switch SW1 may be kept in the ON state in controlling the starter generator 16 to the powering state. As described, in the motor assistance control that involves small power consumption, there is no large current flow from the lead battery 51 to the starter generator 16 even if the switch SW1 is kept in the ON state. Hence, it is possible to stabilize a power supply voltage of the group of the electric devices 64.

[Decelerated Travel Control]

Description now moves on to a decelerated travel control to be executed on the decelerated travel such as coasting. The decelerated travel control may be executed by the fuel control unit 81, the ignition control unit 82, the throttle valve control unit 83, the lock up clutch control unit 84, and the ISG control unit 85 of the main controller 80. Described below is the decelerated travel control in a case where the compressor 18 of the air conditioner is stopped, following which described is the decelerated travel control in a case where the compressor 18 of the air conditioner is in operation. It is to be noted that the coasting means slowly decelerated travel with the release of the stepping down of the accelerator pedal and the brake pedal.

Figure 8:
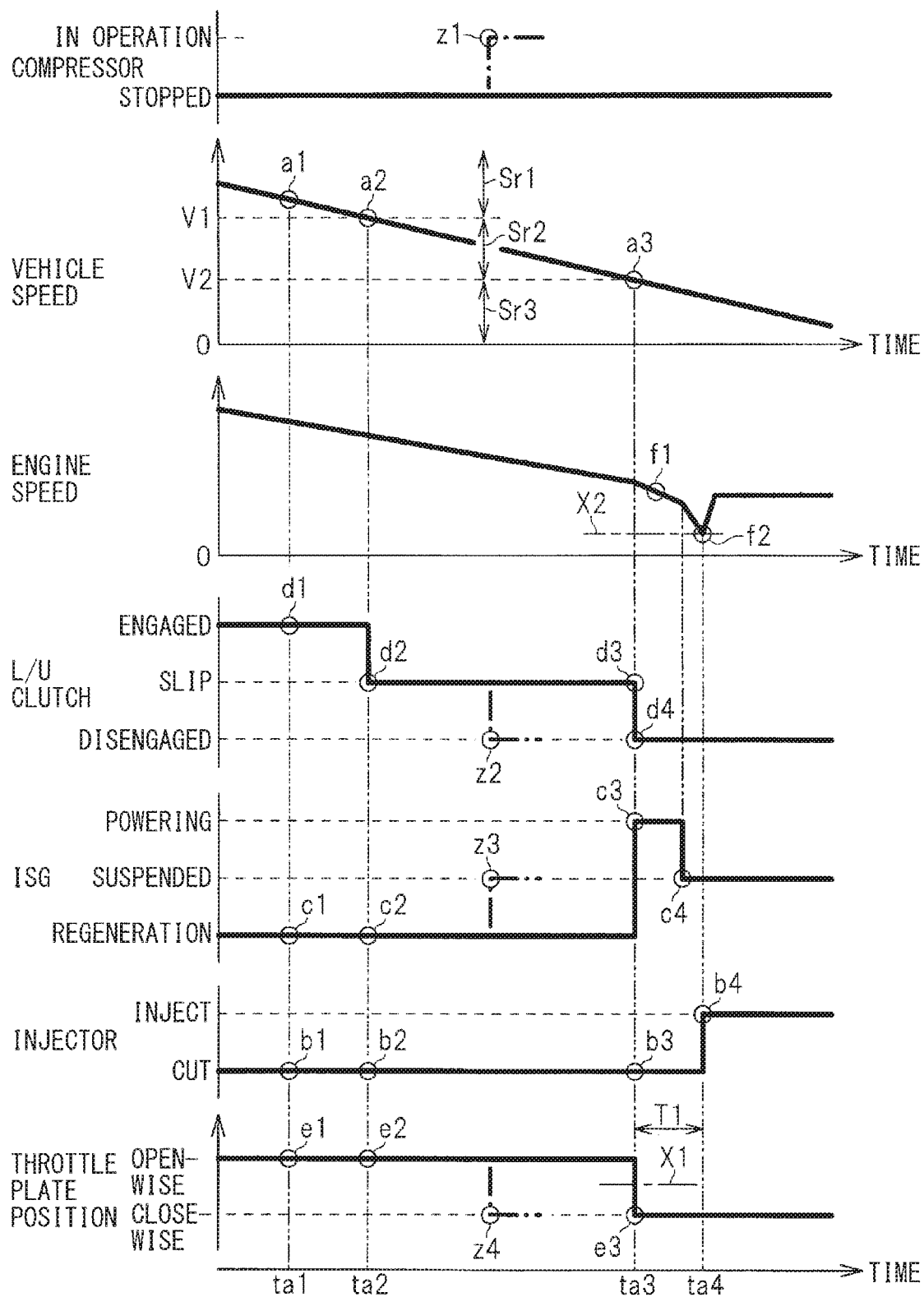
FIG. 8 is a timing chart of an example of operation states of a lock up clutch and other parts, by a decelerated travel control with a compressor stopped.
Figure 9:
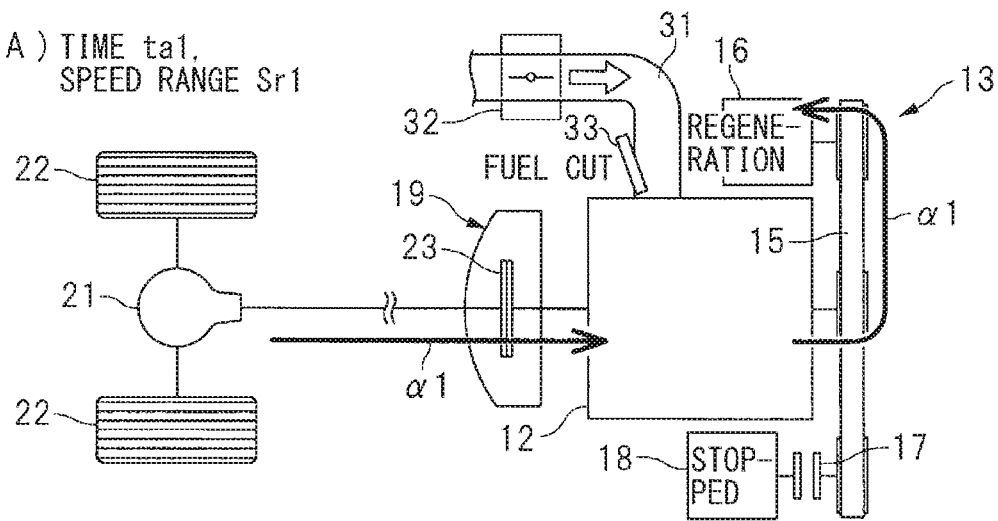
FIG. 9, parts (A) to (C) are schematic diagrams of examples of the operation states of the lock up clutch and other parts, by the decelerated travel control with the compressor stopped.
Figure 9:
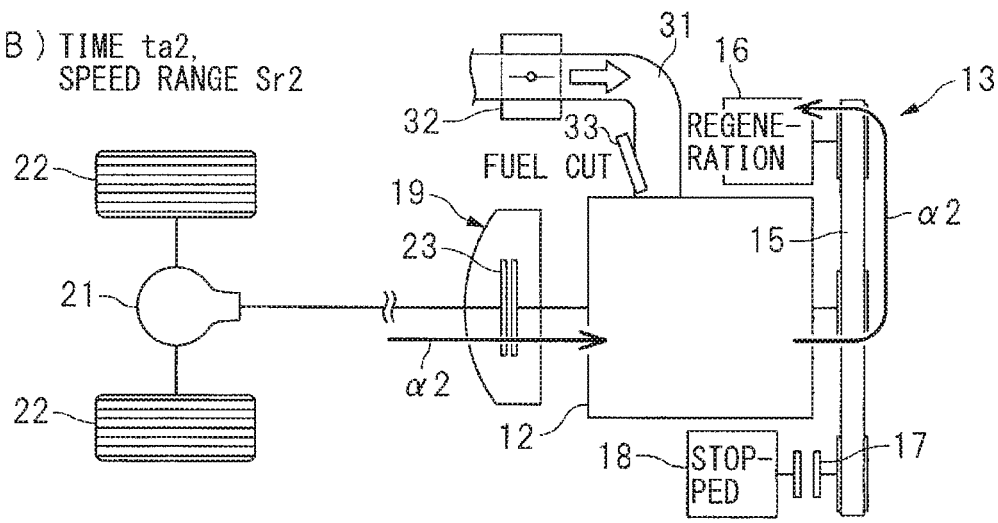
Figure 9:
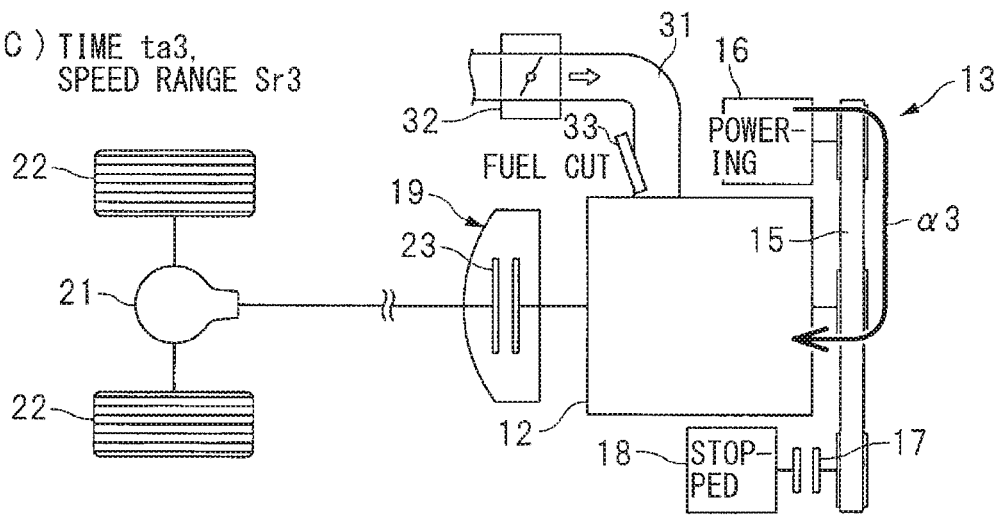

FIG. 8 is a timing chart of an example of operation states of the lock up clutch 23 and other parts, by the decelerated travel control with the compressor 18 stopped. FIG. 9, parts (A) to (C) are schematic diagrams of examples of the operation states of the lock up clutch 23 and other parts, by the decelerated travel control with the compressor 18 stopped. FIG. 9, part (A) illustrates a situation at time ta1. FIG. 9, part (B) illustrates a situation at time ta2. FIG. 9, part (C) illustrates a situation at time ta3.

Figure 10:
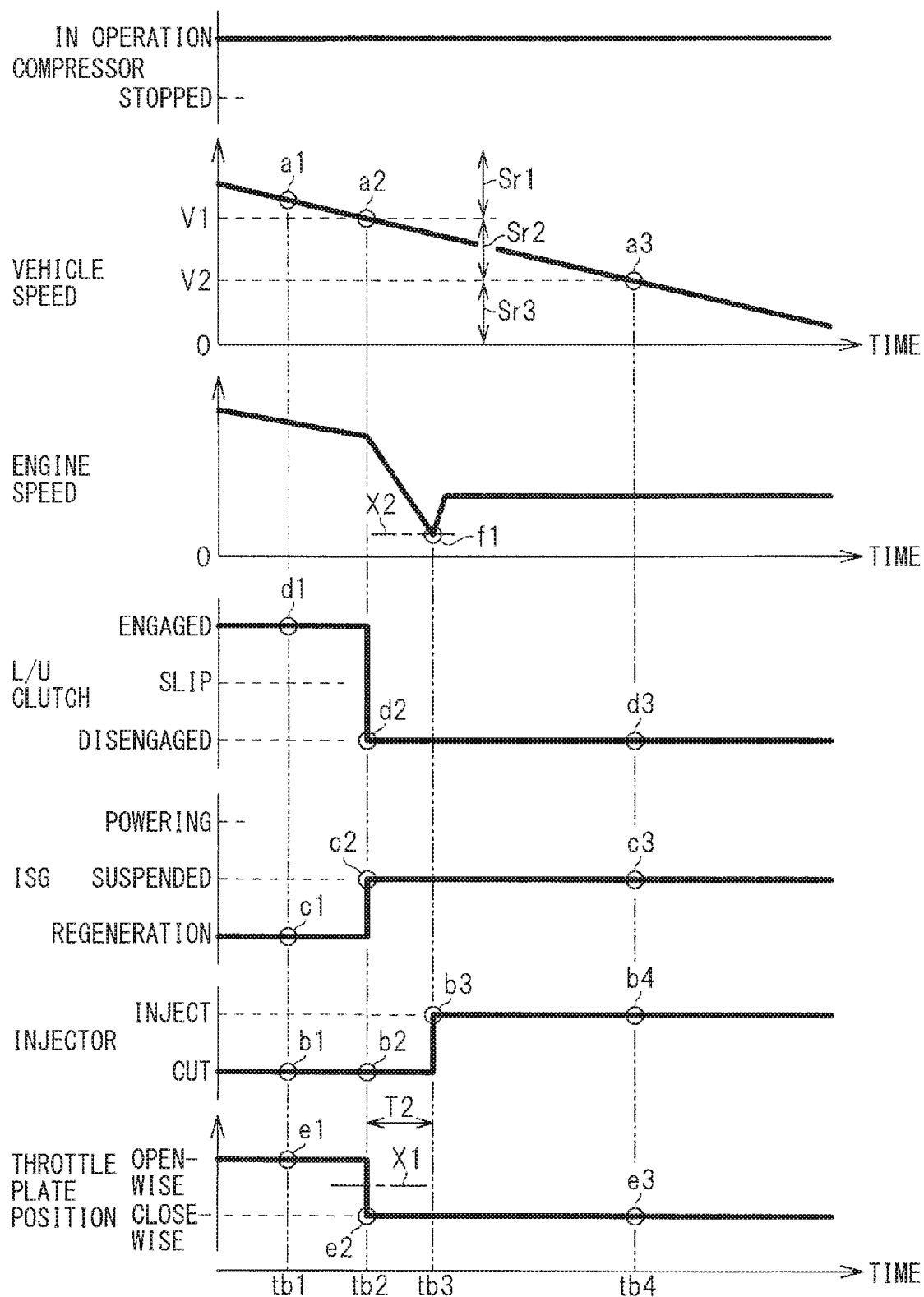
FIG. 10 is a timing chart of an example of the operation states of the lock up clutch and other parts, by the decelerated travel control with the compressor in operation.
Figure 11:
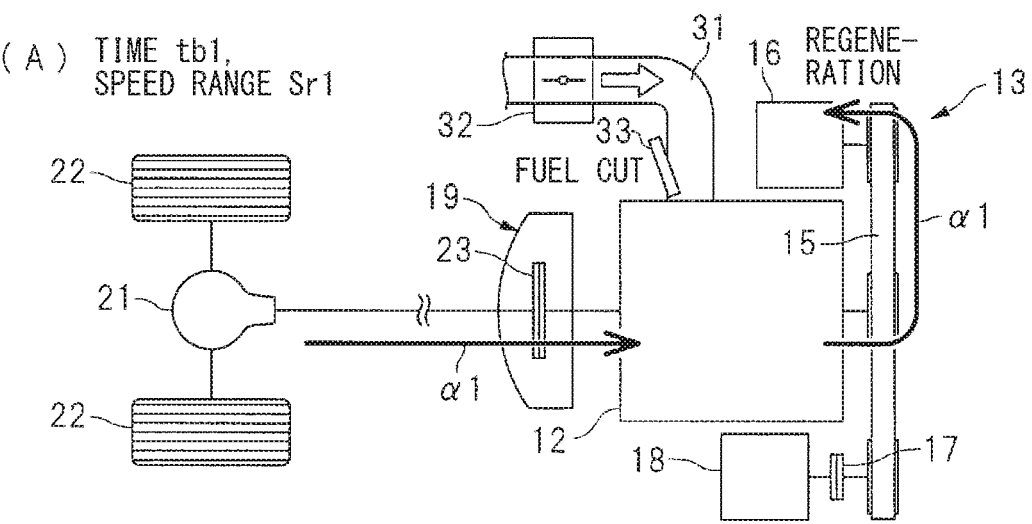
FIG. 11, parts (A) and (B) are schematic diagrams of examples of the operation states of the lock up clutch and other parts, by the decelerated travel control with the compressor in operation.
Figure 11:
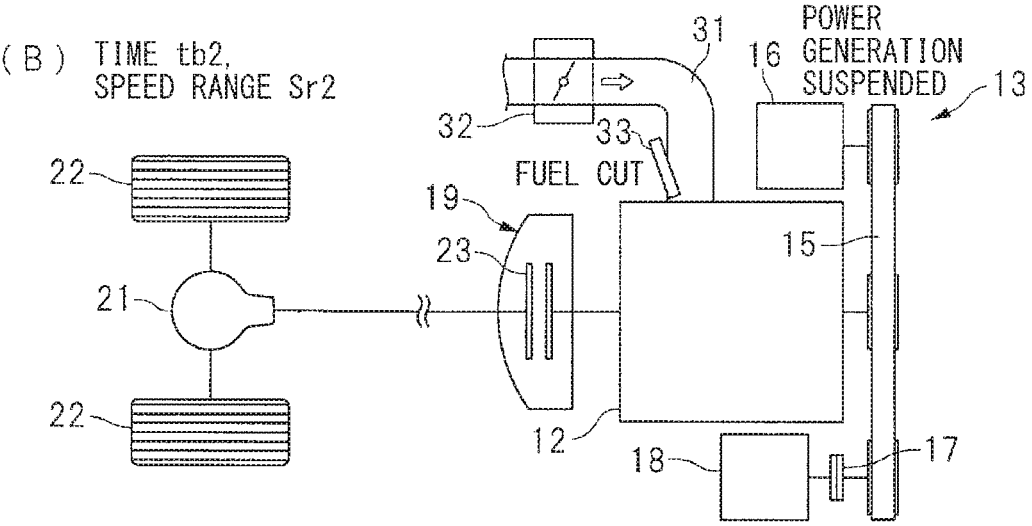

FIG. 10 is a timing chart of an example of the operation states of the lock up clutch 23 and other parts, by the decelerated travel control with the compressor 18 in operation. FIG. 11, parts (A) and (B) are schematic diagrams of examples of the operation states of the lock up clutch 23 and other parts, by the decelerated travel control with the compressor 18 in operation. FIG. 11, part (A) illustrates a situation at time tb1. FIG. 11, part (B) illustrates a situation at time tb2.

In FIGS. 8 and 10, the lock up clutch 23 is abbreviated to "L/U clutch", and the starter generator 16 is abbreviated to "ISG". The throttle plate position of the throttle valve 32 is abbreviated to "throttle plate position". In this specification, the term "openwise" of the throttle valve 32 means a direction in which the throttle plate position becomes greater than a predetermined reference throttle plate position X1, and the term "closewise" of the throttle valve 32 means a direction in which the throttle plate position becomes smaller than the reference throttle plate position X1.

[Timing Chart: With Compressor Stopped]

In the following, described is the decelerated travel control with the compressor 18 stopped, with reference to FIGS. 8 and 9, parts (A) to (C).

(Time Ta1)

As illustrated in FIG. 8, at time ta1, on the decelerated travel (reference characters a1) in a speed region Sr1 in which the vehicle speed is higher than a first vehicle speed V1, the engine 12 may be controlled to the fuel cut state (reference characters b1). The starter generator 16 may be controlled to the regenerative power generation state, that is, the power generation state (reference characters c1). The lock up clutch 23 is controlled to the engaged state (reference characters d1). In other words, as illustrated in FIG. 9, part (A), because the lock up clutch 23 is engaged on the decelerated travel, it is possible to efficiently transmit rotational power from the wheels 22 to the starter generator 16, as denoted by an arrow α1. Hence, it is possible to enhance regenerative torque, i.e., the power generation torque, of the starter generator 16, and to increase the power-generated electric power on the decelerated travel.

Moreover, as illustrated in FIG. 8, at time ta1, on the decelerated travel with the regenerative power generation performed, the throttle valve 32 is controlled openwise (reference characters e1). Controlling the throttle valve 32 openwise in this way makes it possible to increase the amount of the intake air of the engine 12, as denoted by a white outlined arrow in FIG. 9, part (A), leading to reduction in the pumping loss of the engine 12. This makes it possible to reduce engine braking. Hence, it is possible to increase the regenerative torque without an excessive increase in the vehicle deceleration rate, and to increase the power-generated electric power to recover much kinetic energy.

(Time Ta2)

As illustrated in FIG. 8, at time ta2, the vehicle speed lowers to the first vehicle speed V1 (reference characters a2), and thereupon, the lock up clutch 23 is switched from the engaged state to the slip state (reference characters d2). The slip state of the lock up clutch 23 may be continued until the vehicle speed reaches a second vehicle speed V2 lower than the first vehicle speed V1 (reference characters d2 to d3). Moreover, at time ta2, the starter generator 16 may be maintained in the regenerative power generation state (reference characters c2). The engine 12 may be maintained in the fuel cut state (reference characters b2). The throttle valve 32 is maintained openwise (reference characters e2).

As described, on the decelerated travel in a speed region Sr2 in which the vehicle speed is lower than the first vehicle speed V1, the lock up clutch 23 is controlled to the slip state (reference characters d2). Slipping the lock up clutch 23 makes it possible to reduce the rotational power to be transmitted from the wheels 22 to the starter generator 16 through the engine 12, as denoted by an arrow α2 in FIG. 9, part (B). Hence, it is possible to suppress the excessive increase in the vehicle deceleration rate in a low vehicle speed region, and to continue the fuel cut and the regenerative power generation without giving the sense of incongruity to the occupant. Moreover, controlling the lock up clutch 23 as an oil hydraulic clutch to the slip state makes it possible to enhance responsiveness of the lock up clutch 23 to be switched to the disengaged state afterwards.

(Time Ta3 and Time Ta4)

As illustrated in FIG. 8, at time ta3, the vehicle speed lowers to the second vehicle speed V2 (reference characters a3), and thereupon, the lock up clutch 23 is switched from the slip state to the disengaged state (reference characters d4). Moreover, at time ta3, while the engine 12 is maintained in the fuel cut state (reference characters b3), the starter generator 16 may be controlled to the powering state (reference characters c3) and the throttle valve 32 is controlled closewise (reference characters e3). Controlling the starter generator 16 to the powering state as described makes it possible to suppress a rapid fall in the engine speed (reference characters f1) even in the case with the disengagement of the lock up clutch 23. Thereafter, the starter generator 16 may be controlled to the powering state for predetermined time, and thereupon, the starter generator 16 may be switched to the power generation suspended state (reference characters c4). Thereafter, as illustrated in FIG. 8, at time ta4, the engine speed lowers to a predetermined lower limit speed X2 (reference characters f2), and thereupon, the fuel injection into the engine 12 may be restarted (reference characters b4).

The restart of the fuel injection into the engine 12 as described causes the engine torque to be outputted to cause the acceleration of the vehicle 11. This may cause possibility of a considerable decrease in the vehicle deceleration rate on the decelerated travel. Accordingly, as mentioned above, upon the disengagement of the lock up clutch 23 (reference characters d4), the main controller 80 controls the throttle valve 32 closewise (reference characters e3). This makes it possible to keep reducing the amount of the intake air of the engine 12, leading to reduction of the engine torque to a smaller value even in the case with the restart of the fuel injection into the engine 12. In other words, it is possible to restart the fuel injection without giving the sense of incongruity to the occupant. Furthermore, upon the disengagement of the lock up clutch 23 (reference characters d4), the main controller 80 may control the starter generator 16 to the powering state (reference characters c3). This causes the rotational power to be transmitted from the starter generator 16 to the engine 12, as denoted by an arrow α3 in FIG. 9, part (C). Hence, it is possible to suppress the rapid fall of the engine speed. In other words, as illustrated in FIG. 8, it is possible to suppress the rapid fall of the engine speed (reference characters f1), and to take sufficient time T1 before the restart of the fuel injection. It is, therefore, possible to reduce the amount of the intake air sufficiently in preparation for the restart of the fuel injection. Hence, it is possible to control the engine 12 appropriately in preparation for the restart of the fuel injection.

[Timing Chart: With Compressor in Operation]

Described next is the decelerated travel control with the compressor 18 in operation, with reference to FIGS. 10 and 11, parts (A), and (B).

(Time Tb1)

As illustrated in FIG. 10, at time tb1, on the decelerated travel in the speed region Sr1 in which the vehicle speed is higher than the first vehicle speed V1 (reference characters a1), the engine 12 may be controlled to the fuel cut state (reference characters b1). The starter generator 16 may be controlled to the regenerative power generation state (reference characters c1). The lock up clutch 23 is controlled to the engaged state (reference characters d1). In other words, as illustrated in FIG. 11, part (A), because the lock up clutch 23 is engaged on the decelerated travel, it is possible to efficiently transmit the rotational power from the wheels 22 to the starter generator 16, as denoted by an arrow α1. Hence, it is possible to enhance the regenerative torque of the starter generator 16, and to increase the power-generated electric power on the decelerated travel.

Moreover, as illustrated in FIG. 10, at time tb1, on the decelerated travel with the regenerative power generation performed, the throttle valve 32 is controlled openwise (reference characters e1). Controlling the throttle valve 32 openwise as described makes it possible to increase the amount of the intake air of the engine 12, as denoted by a white outline arrow in FIG. 11, part (A). This makes it possible to reduce the pumping loss of the engine 12. It is, therefore, possible to reduce the engine braking. Hence, it is possible to increase the regenerative torque without the excessive increase in the vehicle deceleration rate, and to increase the power-generated electric power to recover much kinetic energy.

(Time Tb2 and Time Tb3)

As illustrated in FIG. 10, at time tb2, the vehicle speed lowers to the first vehicle speed V1 (reference characters a2), and thereupon, with the engine 12 maintained in the fuel cut state (reference characters b2), the lock up clutch 23 is switched from the engaged state to the disengaged state (reference characters d2). The starter generator 16 may be switched from the regenerative power generation state to the power generation suspended state (reference characters c2). The throttle valve 32 is switched from openwise to closewise (reference characters e2). Thereafter, as illustrated in FIG. 10, at time tb3, the engine speed lowers to the predetermined lower limit speed X2 (reference characters f1), and thereupon, the fuel injection into the engine 12 may be restarted (reference characters b3).

The restart of the fuel injection into the engine 12 in this way causes the engine torque to be outputted to cause the acceleration of the vehicle 11. This may cause the possibility of the considerable decrease in the vehicle deceleration rate on the decelerated travel. Accordingly, upon the vehicle speed lowering to the first vehicle speed V1 (reference characters a2), the main controller 80 controls the throttle valve 32 closewise (reference characters e2). This makes it possible to keep reducing the amount of the intake air of the engine 12, as denoted by a white outlined arrow in FIG. 11, part (B). Hence, it is possible to reduce the engine torque to a small value even in the case with the restart of the fuel injection into the engine 12.

In the case with the compressor 18 in the operative state, the engine load increases. This may easily cause the rapid fall of the engine speed, easily resulting in an early restart of the fuel injection. Accordingly, the main controller 80 may stop the regenerative power generation of the starter generator 16 (reference characters c2), and controls the throttle valve 32 closewise (reference characters e2), at early timing at which the vehicle speed becomes lower than the first vehicle speed V1. In other words, in the case with the compressor 18 in the stopped state, the throttle valve 32 is controlled closewise at late timing at which the vehicle speed becomes lower than the second vehicle speed V2. In contrast, in the case with the compressor 18 in the operative state, the throttle valve 32 is controlled closewise at the early timing at which the vehicle speed becomes lower than the first vehicle speed V1. As described, with the compressor 18 in operation, the throttle valve 32 is controlled closewise at the earlier timing than the case with the compressor 18 stopped, to start the reduction in the amount of the intake air. This makes it possible to take sufficient time T2 for the amount of the intake air of the engine 12 to decrease, leading to the reduction in the engine torque to the small value. Hence, it is possible to control the engine 12 appropriately in preparation for the restart of the fuel injection.

(Time Tb4)

It is to be noted that as illustrated in FIG. 10, at time tb4, the vehicle speed lowers to the second vehicle speed V2 (reference characters a3), and thereupon, the lock up clutch 23 is maintained in the disengaged state (reference characters d3). The starter generator 16 may be maintained in the power generation suspended state (reference characters c3). The engine 12 may be maintained in the fuel injection state (reference characters b4). The throttle valve 32 is maintained closewise (reference characters e3). In other words, on the decelerated travel in a speed region Sr3 in which the vehicle speed is lower than the second vehicle speed V2, the lock up clutch 23 is controlled to the disengaged state and the throttle valve 32 is controlled closewise.

[Decelerated Travel Control: Flowchart]

Figure 12:
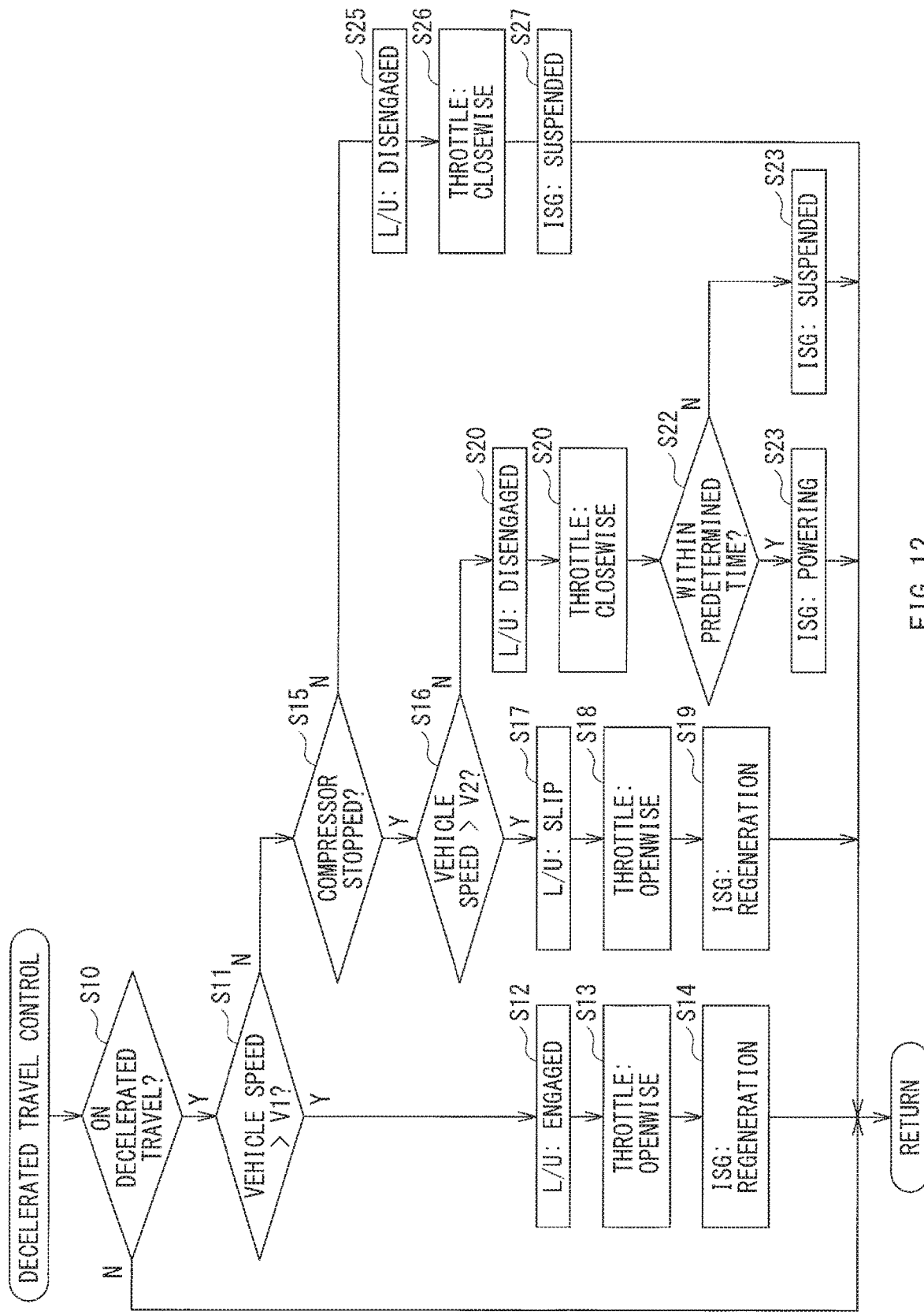
FIG. 12 is a flowchart of an example of an execution procedure of the decelerated travel control.

In what follows, simplified description is given of the forgoing decelerated travel control, with reference to a flowchart. FIG. 12 is a flowchart of an example of an execution procedure of the decelerated travel control. It is to be noted that in FIG. 12, the lock up clutch 23 is abbreviated to "L/U". The starter generator 16 is abbreviated to "ISG". The throttle valve 32 is abbreviated to "throttle".

Referring to FIG. 12, in step S10, a determination may be made as to whether or not the vehicle 11 is on the decelerated travel. In step S10, in a case where a determination is made that the vehicle 11 is on the decelerated travel (Y in step S10), the flow may proceed to step S11. In step S11, a determination may be made as to whether or not the vehicle speed is higher than the first vehicle speed V1. In step S11, in a case where a determination is made that the vehicle speed is higher than the first vehicle speed V1 (Y in step S11), the flow may proceed to step S12 because the vehicle 11 is on the decelerated travel in the speed region Sr1 described above. In step S12, the lock up clutch 23 is controlled to the engaged state, and the flow may proceed to step S13. In step S13, the throttle valve 32 is controlled openwise, and the flow may proceed to step S14. In step S14, the starter generator 16 may be controlled to the regenerative power generation state. In this way, it is possible to enhance the regenerative torque of the starter generator 16 without the excessive increase in the vehicle deceleration rate.

Meanwhile, in step S11, in a case where a determination is made that the vehicle speed is equal to or lower than the first vehicle speed V1 (N in step S11), the flow may proceed to step S15. In step S15, a determination may be made as to whether or not the compressor 18 coupled to the engine 12 is in the stopped state. In step S15, in a case where a determination is made that the compressor 18 is in the stopped state (Y in step S15), the flow may proceed to step S16. In step S16, a determination may be made as to whether or not the vehicle speed is higher than the second vehicle speed V2. In step S16, in a case where a determination is made that the vehicle speed is higher than the second vehicle speed V2 (Y in step S16), the flow may proceed to step S17 because the compressor 18 is in the stopped state and the vehicle 11 is on the decelerated travel in the speed region Sr2 described above. In step S17, the lock up clutch 23 is controlled to the slip state, and the flow may proceed to step S18. In step S18, the throttle valve 32 is controlled openwise, and the flow may proceed to step S19. In step S19, the starter generator 16 may be controlled to the regenerative power generation state. In this way, it is possible to suppress the excessive increase in the vehicle deceleration rate in the low vehicle speed region, and to continue the fuel cut and the regenerative power generation without giving the sense of incongruity to the occupant.

In step S16, in a case where the vehicle speed is equal to or lower than the second vehicle speed V2 (N in step S16), the flow may proceed to step S20 because the compressor 18 is in the stopped state and the vehicle 11 is on the decelerated travel in the speed region Sr3 described above. In step S20, the lock up clutch 23 is controlled to the disengaged state, and the flow may proceed to step S21. In step S21, the throttle valve 32 is controlled closewise. Thereafter, in step S22, a determination may be made as to whether or not duration of the decelerated travel in the speed region Sr3 is within predetermined time. In step S22, in a case where a determination is made that the duration of the decelerated travel in the speed region Sr3 since its start is within the predetermined time (Y in step S22), the flow may proceed to step S23. In step S23, the starter generator 16 may be controlled to the powering state. Meanwhile, in step S22, in a case where a determination is made that the duration of the decelerated travel in the speed region Sr3 since its start is longer than the predetermined time (N in step S22), the flow may proceed to step S24. In step S24, the starter generator 16 may be controlled to the power generation suspended state. In this way, controlling the starter generator 16 to the powering state for the predetermined time makes it possible to suppress the rapid fall of the engine speed. Hence, it is possible to reduce the amount of the intake air sufficiently in preparation for the restart of the fuel injection.

In step S15, in a case where a determination is made that the compressor 18 is in the operative state (N in step S15), the flow may proceed to step S25 because the compressor 18 is in the operative state and the vehicle 11 is on the decelerated travel in the speed regions Sr2 and Sr3 described above. In step S25, the lock up clutch 23 is controlled to the disengaged state, and the flow may proceed to step S26. In step S26, the throttle valve 32 is controlled closewise, and the flow may proceed to step S27. In step S27, the starter generator 16 may be controlled to the power generation suspended state. In this way, in the case with the compressor 18 in operation, the engine speed easily lowers, causing the early restart of the fuel injection. Accordingly, the throttle valve 32 is controlled closewise at earlier timing as soon as the decelerated travel in the speed region Sr2 is started. Hence, it is possible to reduce the amount of the intake air sufficiently in preparation for the restart of the fuel injection.

As described above, on the decelerated travel in the speed region Sr2 in which the vehicle speed is lower than the first vehicle speed V1 and higher than the second vehicle speed V2, in the case with the compressor 18 in the stopped state, the lock up clutch 23 is controlled to the slip state, and the throttle valve 32 is controlled openwise. On the decelerated travel in the speed region Sr2 in which the vehicle speed is lower than the first vehicle speed V1 and higher than the second vehicle speed V2, in the case with the compressor 18 in the operative state, the lock up clutch 23 is controlled to the disengaged state, and the throttle valve 32 is controlled closewise.

In the case with the compressor 18 in the stopped state, the engine load decreases, making it possible to avoid the rapid fall of the engine speed. Accordingly, in the speed region Sr2 in which the vehicle speed is lower than the first vehicle speed V1, the lock up clutch 23 is controlled to the slip state, and the throttle valve 32 is controlled openwise. This makes it possible to lower the engine speed slowly, and to continue the fuel cut state of the engine 12, leading to reduction in the amount of the fuel consumption. Moreover, it is possible to continue the regenerative power generation state of the starter generator 16, leading to recovery of much regenerative electric power.

Moreover, in the case with the compressor 18 in the stopped state, in the speed region Sr3 in which the vehicle speed is lower than the second vehicle speed V2 lower than the first vehicle speed V1, the lock up clutch 23 is controlled to the disengaged state, and the throttle valve 32 is controlled closewise. Thus, in the case with the compressor 18 in the stopped state, it is possible to lower the engine speed slowly. Hence, it is possible to reduce the amount of the intake air sufficiently, and to control the engine 12 appropriately, in preparation for the restart of the fuel injection, even in the case where the throttle valve 32 is controlled closewise in the speed region Sr3.

In contrast, in the case with the compressor 18 in the operative state, the engine load increases, which may easily cause the rapid fall of the engine speed. Therefore, in the speed region Sr2 in which the vehicle speed is lower than the first vehicle speed V1, the lock up clutch 23 is controlled to the disengaged state, and the throttle valve 32 is controlled closewise. This makes it possible to start the reduction in the amount of the intake air at the earlier timing. Hence, it is possible to reduce the amount of the intake air sufficiently, and to control the engine 12 appropriately, in preparation for the restart of the fuel injection.

Although some preferred embodiments of the technology are described above by way of example with reference to the accompanying drawings, the technology is by no means limited to the embodiments described above. It should be appreciated that modifications and alterations may be made by persons skilled in the art without departing from the scope as defined by the appended claims. For example, the vehicle control apparatus 10 includes the starter generator 16 coupled to the engine 12, but this is non-limiting. For example, the technology is also applicable to a vehicle control apparatus that does not control the starter generator 16 to the regenerative power generation state on the decelerated travel. In one specific but non-limiting example, there are cases where the throttle valve 32 is controlled openwise on the decelerated travel, from the viewpoint of the continuation of the fuel cut state of the engine 12 for a long time. Even in such cases, applying the technology makes it possible to control the engine 12 appropriately in preparation for the restart of the fuel injection.

In the example illustrated in FIG. 8, the compressor 18 is kept in the stopped state while the decelerated travel control is being made. In the example illustrated in FIG. 10, the compressor 18 is kept in the operative state while the decelerated travel control is being made. However, these are non-limiting. The compressor 18 may be subject to a switchover between the stopped state and the operative state in accordance with, for example but not limited to, temperature changes in the cabin. In accordance with the switchover, the lock up clutch 23, the starter generator 16, and the throttle valve 32 may be controlled. For example, in FIG. 8, as denoted by reference characters z1, on the decelerated travel in the speed region Sr2, in a case where the compressor 18 is switched from the stopped state to the operative state, the lock up clutch 23 may be switched from the slip state to the disengaged state (reference characters z2). The starter generator 16 may be switched from the regenerative power generation state to the power generation suspended state (reference characters z3). The throttle valve 32 may be switched from openwise to closewise (reference characters z4).

In the forgoing description, the decelerated travel of the vehicle 11 is exemplified by the coasting, i.e., inertia travel. However, this is non-limiting. For example, the decelerated travel control as described may be executed, on the decelerated travel that includes decelerating while stepping down the brake pedal. Moreover, it suffices for the openwise of the throttle valve 32 to be a direction in which the throttle plate position becomes larger than the reference throttle plate position X1. In other words, the openwise of the throttle valve 32 may be a fully opened state, or other states than the fully opened state. Likewise, it suffices for the closewise of the throttle valve 32 to be a direction in which the throttle plate position becomes smaller than the reference throttle plate position X1. In other words, the closewise of the throttle valve 32 may be a fully closed state or other states than the fully closed state.

In the forgoing description, in the case where the compressor 18 is in the stopped state and the vehicle speed is lower than the second vehicle speed V2, the starter generator 16 may be controlled to the powering state for the predetermined time. However, this is non-limiting. For example, the powering state of the starter generator 16 may be stopped on the basis of the engine speed. Moreover, in the examples illustrated in FIGS. 8 and 10, the starter generator 16 is controlled to the power generation suspended state at the restart of the fuel injection into the engine 12. However, this is non-limiting. For example, in the case where the state of charge SOC of the lithium ion battery 52 has lowered, the starter generator 16 may be controlled to the combustion power generation state. Furthermore, at the restart of the fuel injection into the engine 12, an ignition retardation control may be executed. The ignition retardation control may include retarding the ignition timing to reduce the engine torque.

In the forgoing description, the air conditioner clutch 17 is engaged to control the compressor 18 to the operative state, while the air conditioner switch 17 is disengaged to control the compressor 18 to the stopped state. However, this is non-limiting. For example, in a case where a variable capacity compressor that is able to change an amount of compression of refrigerant is adopted as a refrigerant compressor, the refrigerant compressor may be controlled to the operative state and the stopped state by adjusting the amount of compression of the refrigerant. Moreover, in the forgoing description, the main controller 80 serves as the throttle valve control unit 83, the lock up clutch control unit 84, and the ISG control unit 85, and other control units, but this is non-limiting. For example, another controller or other controllers may serve as the throttle valve control unit 83, the lock up clutch control unit 84, and the ISG control unit 85, and other control units.

In the forgoing description, the two electrical energy accumulators are coupled to the starter generator 16. However, this is non-limiting. A single electrical energy accumulator may be coupled to the starter generator 16. Moreover, in the forgoing description, the lead battery 51 and the lithium ion battery 52 are adopted, but this is non-limiting. Batteries or capacitors of other kinds may be adopted. The electrical energy accumulators do not have to be of different kinds, but may be of the same kind. Moreover, in the example illustrated in FIGS. 1 and 2, the switch SW2 is provided on the positive electrode line 54 of the lithium ion battery 52. However, this is non-limiting. For example, as denoted by an alternate long and short dashed line in FIG. 2, the switch SW2 may be provided on the negative electrode line 59 of the lithium ion battery 52.

The throttle valve control unit 83, the lock up clutch control unit 84, the ISG control unit 85, and the main controller 80 illustrated in FIGS. 1 and 3 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the throttle valve control unit 83, the lock up clutch control unit 84, the ISG control unit 85, and the main controller 80. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the throttle valve control unit 83, the lock up clutch control unit 84, the ISG control unit 85, and the main controller 80 illustrated in FIGS. 1 and 3.

It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. A vehicle control apparatus to be mounted on a vehicle, the vehicle control apparatus comprising:
   an engine including an intake system and configured to be controlled from a fuel cut state to a fuel injection state on a condition that an engine speed lowers to a lower limit speed on decelerated travel of the vehicle;
   a refrigerant compressor coupled to the engine and configured to be controlled to an operative state and a stopped state;
   a lock up clutch coupled to the engine and configured to be controlled to an engaged state, a slip state, and a disengaged state;
   a throttle valve provided in the intake system of the engine and configured to be controlled openwise in which a throttle plate position of the throttle valve is greater than a reference throttle plate position and closewise in which the throttle plate position of the throttle valve is smaller than the reference throttle plate position;
   a first deceleration controller configured to control the lock up clutch to the engaged state and control the throttle valve openwise on the decelerated travel of the vehicle in a first speed region in which a vehicle speed of the vehicle is higher than a first vehicle speed;
   a second deceleration controller configured to control the lock up clutch to the slip state and control the throttle valve openwise on a condition that the refrigerant compressor is in the stopped state on the decelerated travel of the vehicle in a second speed region in which the vehicle speed is lower than the first vehicle speed and higher than a second vehicle speed lower than the first vehicle speed, and configured to control the lock up clutch to the disengaged state and control the throttle valve closewise on a condition that the refrigerant compressor is in the operative state on the decelerated travel of the vehicle in the second speed region; and a third deceleration controller configured to control the lock up clutch to the disengaged state and control the throttle valve closewise on the decelerated travel of the vehicle in a third speed region in which the vehicle speed is lower than the second vehicle speed.

2. The vehicle control apparatus according to claim 1, further comprising:
   a motor generator coupled to the engine; and
   a motor controller that controls the motor generator to a power generation state and a powering state, wherein the motor controller controls the motor generator to the power generation state on a condition that the vehicle is on the decelerated travel and that the throttle valve is controlled openwise.

3. The vehicle control apparatus according to claim 2, wherein the motor controller controls the motor generator to the powering state on a condition that the vehicle is on the decelerated travel with the compressor in the stopped state and that the vehicle speed is lower than the second vehicle speed.

4. A vehicle control apparatus to be mounted on a vehicle, the vehicle control apparatus comprising:
   an engine including an intake system and configured to be controlled from a fuel cut state to a fuel injection state on a condition that an engine speed lowers to a lower limit speed on decelerated travel of the vehicle;
   a refrigerant compressor coupled to the engine and configured to be controlled to an operative state and a stopped state;
   a lock up clutch coupled to the engine and configured to be controlled to an engaged state, a slip state, and a disengaged state;
   a throttle valve provided in the intake system of the engine and configured to be controlled openwise in which a throttle plate position of the throttle valve is greater than a reference throttle plate position and closewise in which the throttle plate position of the throttle valve is smaller than the reference throttle plate position; and
   circuitry configured to
      control the lock up clutch to the engaged state and control the throttle valve openwise on the decelerated travel of the vehicle in a first speed region in which a vehicle speed of the vehicle is higher than a first vehicle speed,
      control the lock up clutch to the slip state and control the throttle valve openwise on a condition that the refrigerant compressor is in the stopped state on the decelerated travel of the vehicle in a second speed region in which the vehicle speed is lower than the first vehicle speed and higher than a second vehicle speed lower than the first vehicle speed, and control the lock up clutch to the disengaged state and control the throttle valve closewise on a condition that the refrigerant compressor is in the operative state on the decelerated travel of the vehicle in the second speed region, and
      control the lock up clutch to the disengaged state and control the throttle valve closewise on the decelerated travel of the vehicle in a third speed region in which the vehicle speed is lower than the second vehicle speed.

* * * * *